United States Patent [19]

Bennett

[11] 3,727,179

[45] Apr. 10, 1973

[54] DATA TRANSMISSION RESPONSIVE TO SYNCHRONIZATION SIGNAL

[75] Inventor: Kenneth A. Bennett, Odessa, Tex.
[73] Assignee: Petrodata, Inc., Odessa, Tex.
[22] Filed: Aug. 8, 1969
[21] Appl. No.: 848,511

[52] U.S. Cl. .340/15.5 DT, 340/15.5 BH, 340/18 CT
[51] Int. Cl. .................................................G01v 1/22
[58] Field of Search ..................340/18 CT, 15.5 DT, 340/15.5 BH

[56] References Cited

UNITED STATES PATENTS

| | | | |
|---|---|---|---|
| 2,700,753 | 1/1955 | Peterson | 340/15.5 |
| 2,957,159 | 10/1960 | Fitchette | 340/18 |
| 3,311,876 | 3/1967 | Zee | 340/18 |
| 3,356,990 | 12/1967 | Sloughter | 340/18 |

*Primary Examiner*—Benjamin A. Borchelt
*Assistant Examiner*—N. Moskowitz
*Attorney*—Wofford and Felsman

[57] ABSTRACT

Method and apparatus for transmitting well logging data containing a plurality of functions relating to a plurality of parameters measured by a downhole tool in a borehole penetrating subterranean formations, characterized by transmitting the respective functions, unaltered by surface equipment, on a line sharing basis over a monoline cable in response to a synchronization signal such as formed by a frequency-type signal having at least repetitive pulses of a given polarity from a depth measuring device; and receiving and discriminating the respective functions at a point spaced from the point of transmission in response to a slave synchronization signal that retains the functions synchronized with the sequence of transmission. The raw data at the received location exactly duplicates the raw data logged and eliminates any data being lost through operator error at the well site. Both broader and more specific embodiments and apparatus are also disclosed.

19 Claims, 7 Drawing Figures

DATA TRANSMISSION RESPONSIVE TO SYNCHRONIZATION SIGNAL

BACKGROUND OF THE INVENTION

1. Field of the Invention

This invention pertains to transmission of well logging data in a specific aspect; and to the general transmission of data in a broad aspect. More particularly, it pertains to transmission of data employing an analog signal in the form of frequency-type signals having at least repetitive pulses of a given polarity.

2. Description of the Prior Art

It is known to transmit a plurality of functions related to a plurality of parameters over a single conductor such as a monoline cable. The functions have been sent by a variety of techniques. For example, the functions have been modulated onto carriers and different carriers imposed on the same line, with double demodulation carried out at the reception point. The functions have been changed to analog voltages which have been binary coded and sent in combination with codes for the respective parameters, with decoding by a sorting means at the reception point. The respective parameter-measuring devices downhole have been switched onto the conductor by downhole switches responsive to a device; such as, an acoustic transmitter; to effect a time-sharing arrangement. While the prior art systems have been useful in the environment in which they were employed, they have suffered from limitations in attempting to provide reliable well logging information at the surface at the well site and simultaneously at the home office remote from the well site, since the data, or functions, were almost universally operated upon by surface equipment at the well site. Because the raw functions were operated upon by the surface equipment that was controlled by the operator at the well site, they were subject to variance in quality, depending on the skill of the operator. It was possible to lose data due to a mistake or an inadvertent error on the part of the operator. In addition, sophisticated equipment and circuitry was frequently required in the downhole tool and its operation was difficult to maintain in the nearly perfect operating condition required. Moreover, the approach offered heretofore was essentially a purely time sharing approach in which the functions were transmitted for equal intervals of time. In order that the lowest frequency information could be sampled and transmitted in this interval of time, the intervals were unnecessarily long for some of the high frequency information. The cycles were correspondingly unnecessarily long.

Accordingly, it is an object of this invention to transmit a plurality of functions over a single conductor in response to a synchronization signal that can be employed to effect transmission intervals of variable lengths of time for transmitting functions of various frequencies.

It is a particular object of this invention to transmit raw well logging data in response to a synchronization signal such that the received data can be replayed with the requisite adjustments in gain control to preserve all of the information originally contained therein without regard to operator error at the well site. Other objects and advantages of the invention will become apparent from the description and drawings hereinafter.

DESCRIPTION OF PREFERRED EMBODIMENT

Figure 1:
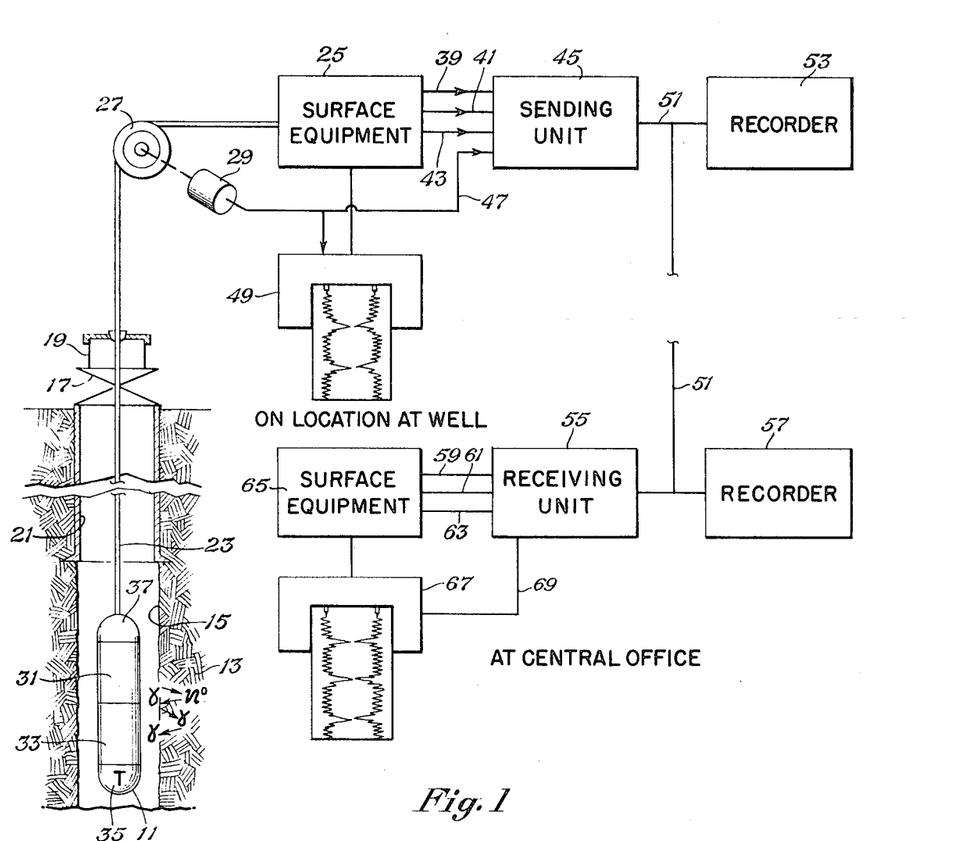
FIG. 1 is a schematic illustration of one embodiment of the invention in which well logging data is transmitted in response to a synchronization signal from a depth measuring apparatus.

Referring to FIG. 1, there is illustrated a borehole logging tool 11 being employed to log subterranean formations 13 through which well 15 penetrates. To get the tool into the well, a conventional christmas tree 17 and lubricator 19 are employed. Well 15 will ordinarily have casing 21 to a greater or lesser depth, cemented into the wellbore in conventional fashion. Logging tool 11 is ordinarily suspended by a cable 23 connecting it with surface equipment 25, and cable 23 is lowered into well 15 over a depth measuring sheave 27. Depth measuring sheave 27 is connected with a depth function generating means 29 which generates a function related to depth. Herein depth function generating means 29 comprises an oscillator which generates a frequency-type output signal having a series of pulses of a given polarity.

Similarly, the respective instruments in logging tool 11 afford a function in the form of a frequency-type signal having at least pulses of a given polarity whose frequency varies in response to variation of data regarding the given parameter being measured in the well. For example, a neutron logging apparatus 31 may emit neutrons into the formation and measure capture gamma rays emitted by the formation in response to the neutron bombardment. In this event, the capture gamma rays may be measured by a photomultiplier tube and the function will be a series of pulses counting the quanta of light emitted in response to the gamma rays. Or a gamma ray logging apparatus may bombard the formation with gamma rays and measure the gamma rays backscattered into the tool. Again the output function is a collection of pulses representing counts from the photomultiplier tube counting the gamma rays backscattered into the tool. Other measurements can be made to effect a frequency-type signal. For example, a temperature measuring apparatus 35 may have an oscillator signal whose frequency is altered by temperature in downhole tool 11. Where a complete frequency signal is given, it may be rectified to afford only pulses of a given polarity. Such pulses are preferable since they readily enable employing both positive and negative polarity functions.

Cable 23 is preferably a monoline cable with which the respective instruments in downhole tool 11 are alternately connected for transmitting their respective functions to surface equipment 25. Conventional downhole switching may be employed in section 37 of tool 11 to effect the respective connections of the downhole measuring apparatus with cable 23. Alternatively, cable 23 may comprise coaxial cable containing a multiplicity of conductors to directly connect each respective downhole measuring apparatus with surface equipment 25.

In any event, the raw data from the downhole measuring apparatus in tool 11 is sent via conductors 39, 41 and 43 to sending unit 45 before the data is operated upon by the surface equipment. The output from depth function generating means 29 is also sent via conductor 47 to sending unit 45.

Ordinarily, the data is also operated upon by surface equipment 25 and the functions sent to a recorder; such as, strip chart recorder 49. Strip chart recorder 49 is moved in response to the function from depth function generating means 29 to afford a display of the respective functions being measured on the chart moved in proportion to depth movement of the downhole tool 11. The record obtained in the form of a strip chart in the logging truck on location at the well is thus subject to the vagaries of the operator and will reflect any errors made by the operator. On the other hand, the data sent to sending unit 45 will not be subject to these errors as discussed in more detail hereinafter.

Thus, in sending unit 45 conductors 39, 41 and 43, ultimately connected with respective downhole measuring apparatus serve as a plurality of input means. Each are connected for providing a function related to respective data concerning a given parameter measured by its associated downhole measuring apparatus. Sending unit 45 also includes a plurality of transmitting gating means connected respectively with one of the input means and operable into a first condition for gating through a function from the one of the input means and into a second condition for blocking the function from the one of the input means in response to a frequency-type synchronization signal having at least repetitive pulses of a given polarity. The function related to depth from depth function generating means 29 via conductor 47 serves as a clocking input means for effecting the synchronization signal. Sending unit 45 also has clocking flip-flop means connected with the transmitting gating means and with the clocking input means so as to render respective ones of the transmitting gating means in the first condition in response to the synchronization signal and in sequence to complete a cycle. Sending unit 45 also contains an inverter amplifier means for inverting and amplifying a synchronization signal and a synchronization gating means connected at least with the clocking flip-flop means at the terminal that changes its state of electrical charge no more often than any other and with the inverter amplifier for sending a master synchronization signal after a complete cycle. Sending unit 45 also includes an amplifier means connected with the gating means for transmitting the signals gated therethrough.

The resulting functions and signals are transmitted via communications link, illustrated as conductor 51. If desired, recording means; such as, tape recorder 53; may be connected with conductor 51 to preserve a record of the transmitted functions and signals at the location at the well. The recorded functions and signals facilitate playback through surface equipment 25 to obtain a corrected record at the well site on strip chart recorder 49 if part of the logging data was lost due to the above referred to errors by the operator.

At a location spaced from, but in communication with the sending unit; for example, at a central office; a receiving unit 55 is connected via conductor 51 with sending unit 45. A second recording means; such as, tape recorder 57; can be connected with conductor 51 to preserve the record as it is received.

Receiving unit 55 contains a discriminating means for discriminating the master synchronization signal and a frequency increasing means for increasing the frequency of the master synchronization signal back to the same frequency as the synchronization signal to form a slave synchronization signal that is synchronized with the synchronization signal. Receiving unit 55 also includes a plurality of receiving gating means, each in communication with the amplifier means for receiving the functions and signals gated through the associated transmitting gating means and operable into a first condition for gating through the function from the associated transmitting gating means and to a second condition for blocking the function in response to the slave synchronization signal. Receiving unit 55 also includes clocking flip-flop means connected with the receiving gating means so as to render respective ones of the receiving gating means in the first condition in response to the slave synchronization signal and in the same sequence as the transmitting gating means associated with the respective functions. A plurality of output means are each connected respectively with one of the receiving gating means for duplicating the original data. Specifically, conductors 59, 61, and 63 may be connected with respective channels in surface equipment 65 and connected with pens on a strip chart recorder 67 to obtain a strip chart that duplicates the one on location at the well if the one on location at the well has no errors. The strip chart recorder 67 is also connected via conductor 69 with receiving unit 55 and the strip chart thereon is moved in response to the slave synchronization signal, which is equivalent to the depth signal.

Operationally, logging tool 11 is moved along the longitudinal axis of well 15 logging the subterranean formations. Depth signal from depth function generating means 29 forms a clocking input. After a predetermined number of pulses completes a predetermined cycle, a master synchronization signal is generated and transmitted for use as a reference point. The master synchronization signal is inverted and amplified to facilitate its discrimination and serves as a basis against which to synchronize the other functions. Employing the depth signal, sending unit 45 transmits a first function related to a first parameter before that function is operated on by surface equipment, in response to a first condition effected by the frequency-type depth signal. The transmission of the first function is interrupted and a second function relating to a second parameter is transmitted in response to a second condition effected by the frequency-type depth signal. Transmission of the second function is stopped and if other functions are to be transmitted, they are sequentially transmitted to effect a predetermined cycle. After a complete cycle, the master synchronization signal is inverted and amplified and the steps repeated.

At the central office, where receiving unit 55 is located, the master synchronization signals are received, recorded, discriminated and their frequency returned to the original frequency of the frequency-type depth signal from the depth measuring means to form a slave depth signal that is synchronized with the depth signal. The first function is received and recorded in response to the first condition effected by the slave depth signal in synchronization with the first condition effected by the depth signal. Thereafter, the receiving and recording of the first function is discontinued and the second function is received and recorded in response to the second condition effected by the slave depth signal in synchronization with the second condition effected by the depth signal. Thereafter, the receiving and recording of the second function is discontinued and other functions, if being transmitted, may be received to complete a cycle. A plurality of cycles are ordinarily employed.

Figure 2:
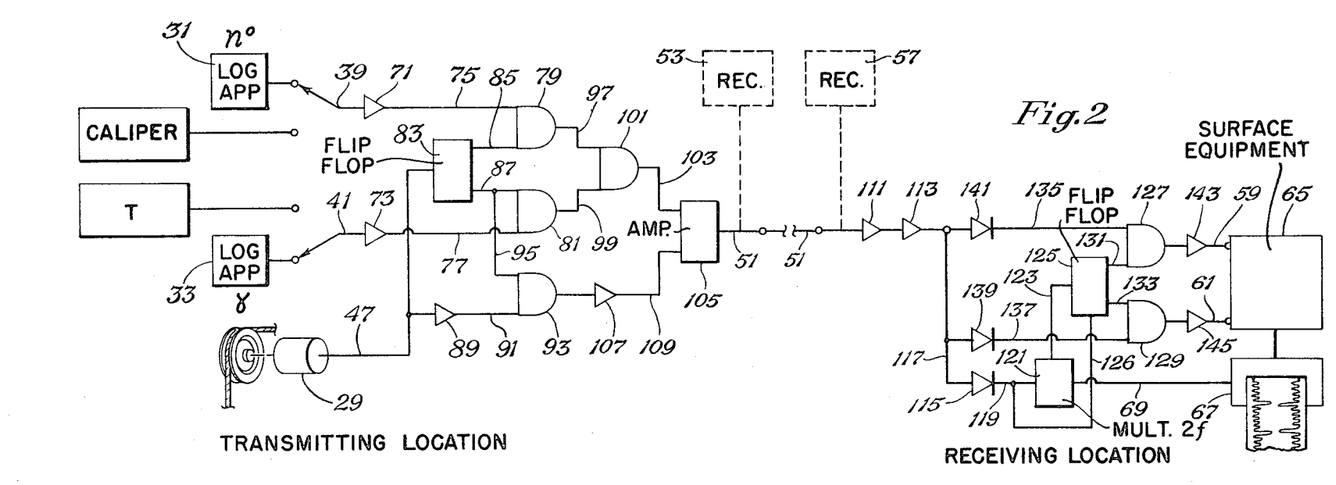
FIG. 2 is a schematic illustration of an electrical circuit employed in one embodiment of the invention for transmitting two functions from a first point to a receiving point remote therefrom.

FIG. 2 illustrates schematically an electrical circuit for transmitting two functions from a plurality of input means. The functions may be the output from a neutron logging apparatus 31 or a gamma ray logging apparatus 33. On the other hand, any two variables could be employed. For example, temperature and caliper information could be switched onto and serve as the plurality of input means for conductors 39 and 41. In any event, the input means are connected, respectively, with inverter amplifiers 71 and 73 for inversion and amplification of the respective functions. The respective inverter amplifiers are connected via conductors 75 and 77 to one input terminal each of NAND gates 79 and 81. NAND gates 79 and 81 operate, as do NAND gates generally, in the "on" condition to conduct a function onward if a true signal, otherwise referred to as a unit signal, exists at only one input terminal and not at both input terminals. NAND gates are but one of at least four types of logic circuits that could be readily employed. Other logic circuits that could be satisfactorily employed and AND gates, OR gates, and NOR gates. Alteration of the arrangement of logic described hereinafter with respect to NAND gates to enable employing one of the other logic circuit gates is well known and need not be described in detail herein.

The depth function generating means 29 is connected via cable 47 to clocking flip-flop 83. The upper and lower terminals of clocking flip-flop 83 are connected, respectively, with the other input terminals of NAND gates 79 and 81, as illustrated, via conductors 85 and 87. The respective outputs of NAND gates 79 and 81 on conductors 97 and 99 are connected to the input terminals of NAND gate 101 for isolation from each other. NAND gate 101, moreover, prevents simultaneous transmission of both functions even if one of the NAND gates should operate improperly, since it blocks if signals are impressed simultaneously onto both conductors 97 and 99. This ensures that only one function is transmitted at a time. Output terminal of NAND gate 101 is connected via conductor 103 to amplifier, or driver, 105.

The depth function generating means 29 is also connected to inverter amplifier 89 for inversion and amplification of the frequency-type depth signal generated; and, thence, via conductor 91 to one input terminal of NAND gate 93. The other terminal of NAND gate 93 is connected via conductor 95 with conductor 87 from the lower output terminal of clocking flip-flop 83 for generating at each second pulse of the depth function, or signal, a master synchronization signal. The output terminal of NAND gate 93 is connected to inverter amplifier 107 for inversion and amplification of the master synchronization signal. Inverter amplifier 107 is connected via conductor 109 to amplifier 105.

Tape recorders 53 and 57 are shown in dotted lines connected with conductor 51, since they may be provided if desired, at both the transmitting and receiving locations.

At the receiving location, conductor 51 is connected to double inverter amplifiers 111 and 113 for large amplification of the weak functions and signals being transmitted over conductor 51. Diode means 115 is connected via conductor 117 with inverter amplifier 113 so as to discriminate and pass the master synchronization signal. Diode means 115 is connected via conductor 119 with a frequency increasing means; such as, frequency doubler 121. Frequency doubler 121 is provided for increasing the frequency of the master synchronization signal back to the frequency of the original depth signal and has its output terminal connected via conductor 123 with clocking flip-flop 125. Conductor 119 is also connected via conductor 126 with the reset contact of clocking flip-flop 125 to force it into synchronization with the master synchronization signal regardless of whether or not the frequency doubler may have missed a portion of a cycle.

NAND gates 127 and 129 are connected with the respective output terminals of clocking flip-flop 125 via conductors 131 and 133. NAND gates 127 and 129 are also connected with conductor 117 via conductors 135 and 137 and diode means 139 and 141. Thus, NAND gates 127 and 129 will be rendered oppositely and alternately conductive and nonconductive by clocking flip-flop 125 to gate respective functions therethrough. NAND gates 127 and 129 are connected with the conventional surface equipment 65 via conductors 59 and 61 and via inverter amplifiers 143 and 145. The respective parameters may be displayed, as described hereinbefore on strip chart recorder 67 being moved in response to slave depth signal via conductor 69.

Figure 3:
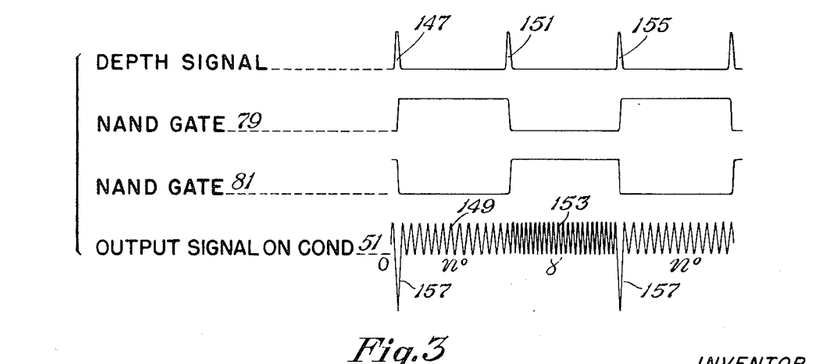
FIG. 3 is a diagrammatic representation of signals and conditions for elements illustrated in FIG. 2.

FIG. 3 is a diagrammatic representation of the interrelationship between pulses of the depth signal or, as illustrated in dashed lines, an oscillator means, affording a clocking input and the times NAND gates 79 and 81 of FIG. 2 transmit their respective functions and the resulting output signal.

The operation of the embodiment illustrated in FIG. 2 is indicated by the output signals illustrated in FIG. 3. Therein, for example, a first pulse from depth function generating means 29 via conductor 47 effects a unit signal on the lower output terminal of clocking flip-flop 83 and on conductor 87, thereby blocking transmission of the gamma information through NAND gate 81. On the other hand, a zero signal is sent to the input terminal of NAND gate 79 and effects conduction of the neutron log data through NAND gate 79. As illustrated in FIG. 3, in response to the first pulse 147, NAND gate 79 is rendered conductive, shown by an "on", or unit, signal and NAND gate 81 is rendered nonconductive as shown by an "off", or zero, signal. As indicated, the first half of the cycle on the output signal 149 is a function related to data from the neutron logging apparatus. On the second pulse 151 from the depth function generating means, NAND gate 79 is turned off, or rendered nonconductive, and NAND gate 81 is turned on, or rendered conductive, to pass for transmission as output signal on conductor 51, a second function 153 related to data from the gamma logging apparatus. The alternating functions are conducted through NAND gate 101, amplified by amplifier 105 and transmitted to the receiving location. Every second depth pulse; such as, pulses 147 and 155; are inverted and amplified to form a master synchronization signal 157 of opposite polarity from the functions related to the respective parameters.

At the receiving location, the master synchronization signals are amplified and passed through diode means 115. They are doubled in frequency by frequency doubler 121 and sent to flip-flop 125. The master synchronization signals are also sent as a direct reset to clocking flip-flop 125 and prevent any variation or error such as obtaining the wrong function on the wrong output means. Clocking flip-flop 125 oppositely, alternately and synchronously turns on NAND gates 127 and 129 to conduct the function related to the neutron measuring apparatus through conductor 59 and the function related to the gamma measuring apparatus through conductor 61 and the respective inverter amplifiers 143 and 145. Surface equipment 65 is employed to convert the received functions into more appropriate analog signals; that are, in turn, sent to strip chart recorder 67 to operate the respective pens thereon. Strip chart recorder 67 is moved in response to slave depth signal from the frequency doubler 121 that is synchronized with the depth signal from the depth function generating means 29. Accordingly, the strip chart from strip chart recorder 67 duplicates a correct strip chart at the transmitting location. On the other hand, it can be corrected by adjusting gain controls and the like on surface equipment 65 to correct a condition causing loss of data on a strip chart at the well site. The received data recorded on tape recorder 57 can be replayed with appropriate adjustments to effect a very nearly perfect strip chart which preserves all of the data originally present in the functions.

Figure 4:
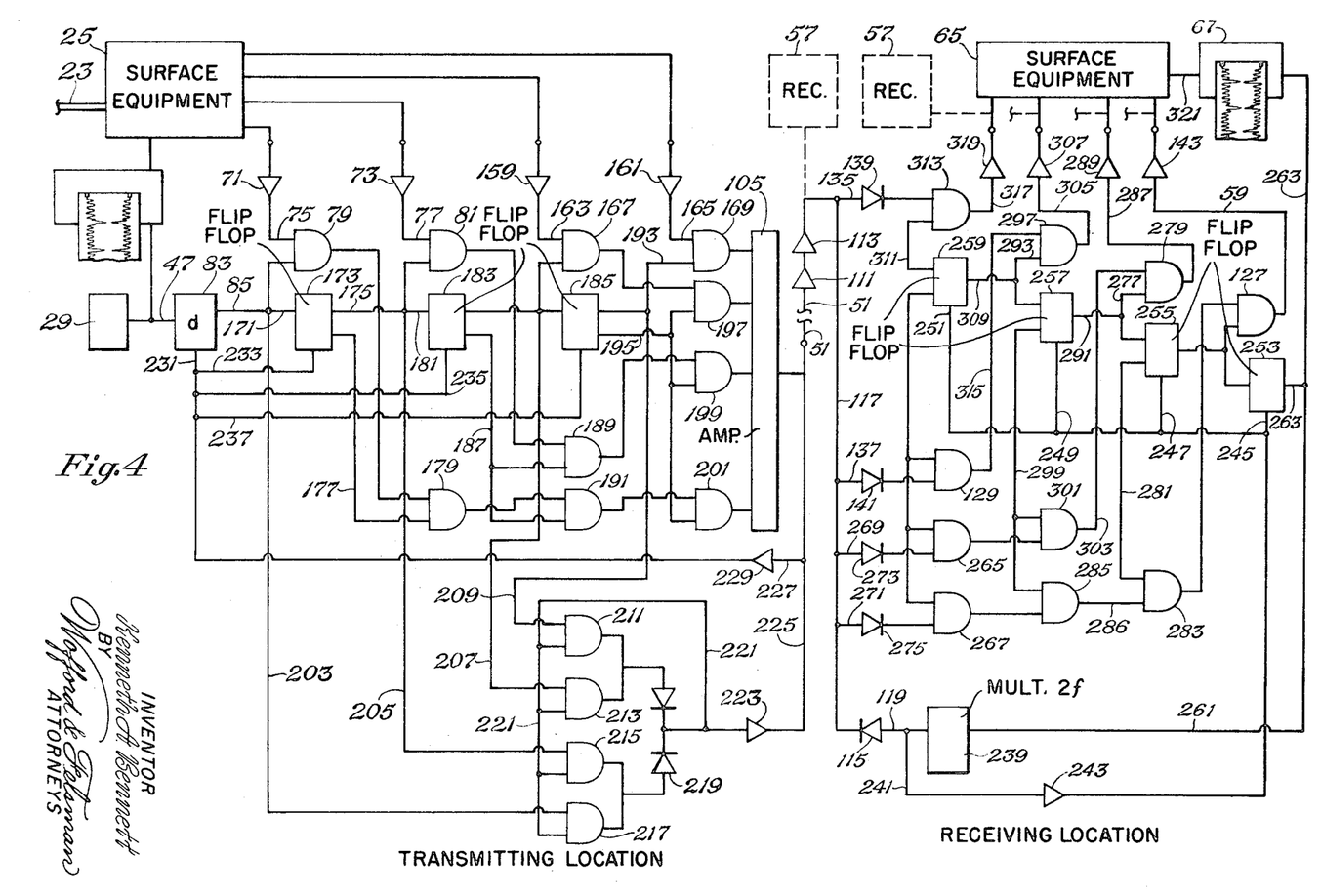
FIG. 4 is a schematic illustration of an electrical circuit employed in another embodiment of the invention for transmitting four functions over a monoline cable and receiving and discriminating the respective four functions at a point remote therefrom.

FIG. 4 illustrates schematically an electrical circuit for transmitting four functions within a cycle and a fifth function as the synchronization signal. As indicated hereinbefore, the functions may be any functions having a frequency-type signal; such as, the output from a downhole logging tool incorporating apparatus for measuring various parameters of the subterranean formation through which the logging tool is passed. For example, cable 23 may connect the four parameter-measuring apparatus, serving as input means with surface equipment 25 for supplying the respective functions thereto; while oscillator means; such as, the depth function generating means 29; serves as the clocking input means. The input means are connected, respectively, with inverter amplifiers 71, 73, 159, and 161 for inversion and amplification of the respective functions. The inverter amplifiers are connected, respectively, via conductors 75, 77, 163, and 165 to one input terminal each of NAND gates 79, 81, 167 and 169.

The depth function generating means 29 is connected via cable 47 to clocking flip-flop 83. The upper terminal of clocking flip-flop 83 is connected via conductor 85 with the other terminal of NAND gate 79 for alternately rendering NAND gate 79 conductive and nonconductive. Clocking flip-flop 83 is also connected, via its upper output terminal and conductor 171 with the input terminal of a second clocking flip-flop 173.

Clocking flip-flop 173 is connected via its upper output terminal and conductor 175 with the other input terminal of NAND gate 81 to alternately render NAND gate 81 conductive and nonconductive. Clocking flip-flop 173 is also connected via its lower output terminal and conductor 177 with NAND gate 179 for alternately rendering NAND gate 179 nonconductive and conductive, out of phase with NAND gate 81.

The output terminal of NAND gate 79 is connected with the other input terminal of NAND gate 179 for blocking or effecting further conduction therethrough of the associated function conducted through NAND gate 79 and NAND gate 179 is rendered conductive. The upper output terminal of clocking flip-flop 173 is also connected via conductor 181 with the input terminal of clocking flip-flop 183.

Clocking flip-flop 183 is connected, in a manner similar to that just described with respect to clocking flip-flop 173, via its upper output terminal with one input terminal of NAND gate 167 for rendering NAND gate 167 alternately conductive and nonconductive and with the input terminal of clocking flip-flop 185. Likewise, clocking flip-flop 183 is connected via its lower output terminal and conductor 187 with NAND gates 189 and 191 for alternately rendering them nonconductive and conductive, out of phase with NAND gate 167.

The output terminal of NAND gate 81 is connected to the other input terminal of WAND gate 189 and the output terminal of NAND gate 179 is connected to the other input terminal of NAND gate 191 for either blocking or effecting further conduction therethrough of the respective associated functions conducted through either NAND gate 81 or NAND gate 179.

Similarly, clocking flip-flop 185 is connected via its upper output terminal and conductor 193 with one input terminal of NAND gate 169 for alternately rendering NAND gate 169 conductive and nonconductive. Clocking flip-flop 185 is connected via its lower output terminal and conductor 195 with NAND gates 197, 199, and 201 for rendering them alternately nonconductive and conductive, out of phase with NAND gate 169.

The output terminal of NAND gate 167 is connected to the other input terminal of NAND gate 197 and the output terminals of NAND gates 189 and 191 are connected respectively to the other input terminals of NAND gates 199 and 201 for blocking or effecting further conduction therethrough of the respective associated functions conducted through NAND gates 167, 189, and 191.

The output terminals of NAND gates 169, 197, 199, and 201 are connected via their respective conductors with amplifier 105 for transmission to a receiving location.

To ensure that the respective functions are synchronized a direct reset signal is provided in response to the master synchronization signal to override all other elements in the system and effect a reset of all gating means to a starting position for a new cycle. In this way, jumbling of the functions through inadvertent missing of a pulse in the clocking input signal is prevented. Specifically, the upper output terminals of clocking flip-flops 83, 173, 183, and 185 are connected via conductors 203, 205, 207 and 209 with NAND gates 211, 213, 215, and 217. The output terminals of the NAND gates 211, 213, 215, and 217 are suitably joined via conductors and diode means 219 as illustrated and connected via feedback conductor 221 to their other respective input terminals for inhibiting a master synchronization signal until the outputs from all of the respective clocking flip-flops have a common signal and for generating a master synchronization signal when a common signal is present on each of the upper output terminals of all of the clocking flip-flops.

Feedback conductor 221 is connected with inverter amplifier 223 for inversion, amplification and transmission of the master synchronization signal via conductor 225 to the receiving location. Although not ordinarily necessary, if desired, at the transmitting location the master synchronization conductor 225 may be connected via conductor 227 with inverter amplifier 229 and subsequently with the reset terminals, via conductors 231, 233, 235, and 237, of clocking flip-flops 83, 173, 183, and 185 to ensure synchronizing all clocking flip-flops to begin a new cycle simultaneously.

Conductor 225 is also connected with conductor 51 which ultimately connects with the receiving location. At the receiving location, conductor 51 is connected to serially connected, double inverter amplifiers 111 and 113 for large amplification of the weak functions and signals being transmitted over conductor 51. Diode means 115 is connected via conductor 117 with inverter amplifier 113 so as to discriminate and pass the master synchronization signal. Diode means 115 is connected via conductor 119 with frequency increasing means; such as, multiplier 239; which multiplies the synchronization signal by a factor of 16 to increase it back to the original frequency from clocking input means 29.

Conductor 119 is also connected via conductor 241 and inverter amplifier 243 and conductors 245, 247, 249, and 251 with the reset terminals of clocking flip-flops 253, 255, 257, and 259 for providing a direct reset function that overrides all other signals and synchronizes all the clocking flip-flops to begin a new cycle.

Multiplier 239, for forming a slave synchronization signal that is synchronized to the synchronization signal from clocking input means 29, is connected via conductor 261 with clocking flip-flop 253 for supplying a slave clocking input signal. If desired, it also may be connected via conductor 263 for driving a strip chart recorder 67. The interconnection of the clocking flip-flops and the respective NAND gates is inverse to that at the transmitting location. Specifically, clocking flip-flop 253 is connected via its upper terminal with NAND gate 127 for alternately rendering NAND gate 127 conductive and nonconductive. Clocking flip-flop 253 is also connected via its upper terminal with the input terminal of clocking flip-flop 255.

Clocking flip-flop 255 is connected via its upper terminal and conductor 277 with one input terminal of NAND gate 279 for alternately rendering NAND gate 279 conductive and nonconductive. Clocking flip-flop 255 is also connected via its lower terminal and conductor 281 with one input terminal of NAND gate 283, for alternately rendering NAND gate 283 nonconductive and conductive, out of phase with NAND gate 279.

The output terminal of NAND gate 283 is connected to the other input terminal of NAND gate 127. The output terminal of NAND gate 127 is connected with surface equipment 65 via conductor 59 and inverter amplifier 143.

Clocking flip-flop 255 is also connected via its upper terminal and conductor 291 with the input terminal of clocking flip-flop 257. Clocking flip-flop 257 is connected via its upper terminal and conductor 293 with one input terminal of NAND gate 297 for alternately rendering NAND gate 297 conductive and nonconductive. Clocking flip-flop 257 is connected via its lower terminal and conductor 299 with one input terminal each of NAND gates 285 and 301 for alternately rendering them nonconductive and conductive, out of phase with NAND gate 297.

The output terminal of NAND gate 285 is connected via conductor 286 with the other input terminal of NAND gate 283.

The output terminal of NAND gate 301 is connected via conductor 303 with the other input terminal of NAND gate 279. The output terminal of NAND gate 279 is connected with surface equipment 65 via conductor 287 and inverter amplifier 289.

Clocking flip-flop 257 is also connected via its upper terminal and conductor 309 with the input terminal of clocking flip-flop 259. Clocking flip-flop 259 is connected via its upper terminal and conductor 311 with one input terminal of NAND gate 313 for alternately rendering NAND gate 313 conductive and nonconductive. Clocking flip-flop 259 is connected via its lower terminal with one input terminal on each of NAND gates 129, 265, and 267, for rendering them alternately nonconductive and conductive, out of phase with NAND gate 313. The other input terminals of NAND gates 313, 129, 265, and 267 are also connected with conductor 117 via conductors 135, 137, 269, and 271 and diode means 139, 141, 273, and 275. Thus NAND gate 313 will be rendered conductive at the same time NAND gates 129, 265 and 267 are rendered nonconductive.

The output terminal of NAND gate 129 is connected via conductor 315 with the other input of NAND gate 297. The output terminal of NAND gate 297 is connected with surface equipment 65 via conductor 305 and inverter amplifier 307.

The output terminal of NAND gate 313 is connected with surface equipment 65 via conductor 317 and inverter amplifier 319.

Thus, it can be seen that respective paths for the respective functions can be traced from common incoming conductor 117 to surface equipment 65. For example, a complete path can be traced via diode means 139, NAND gate 313 and inverter amplifier 319 for one function; a second path can be traced serially via diode means 141, NAND gates 129 and 297, and inverter amplifier 307 for a second function; a third path can be traced via diode means 273, NAND gates 265, 301 and 279, and inverter amplifier 289 for a third function; and a path can be traced via diode means 275, NAND gates 267, 285, 283, and 127 and inverter amplifier 143 for a fourth function. The fifth function, employed as the synchronization signal may be used to advance a strip chart on a strip chart recorder and need not be conveyed to surface equipment 65.

Surface equipment 65 is connected with strip chart recorder 67 via conductors 321 for recording the various parameters on the strip chart being moved in response to slave depth signal via conductor 263.

Recorders 57 are shown in dashed lines connected with conductor 117 and with the respective conductors to surface equipment 65 simply to illustrate that the recorders may be employed to record the entire incoming signals and functions for replay through the entire apparatus or they may be employed to record the functions individually. If recorded individually, the functions are synchronized with the slave synchronization signal or with the master synchronization signal to effect a correlation with depth, or other parameter being employed as the synchronization signal.

Figure 5:
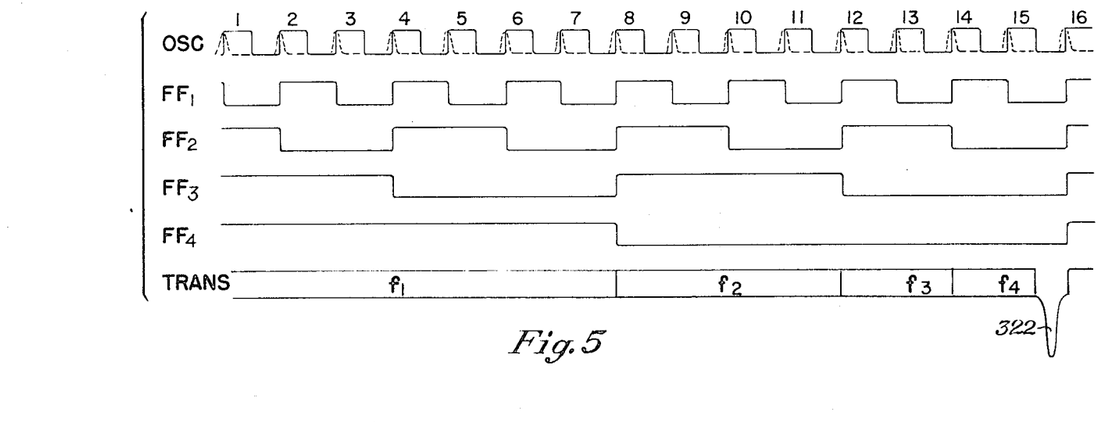
FIG. 5 is a diagrammatic representation of the signals and conditions of the respective elements during one cycle of transmission in the embodiment illustrated in FIG. 4.

The operation of the embodiment illustrated in FIG. 4 is indicated by the output signals illustrated in FIG. 5. FIG. 5 is a diagrammatic representation of the interrelationship between the clocking input signal; indicated as "osc" for oscillating signal from a master oscillator, or in dashed lines as pulses from depth function generating means 29 when the logging tool is being moved uniformly along the borehole. Each pulse of the clocking input signal effects a change on a given output terminal of clocking flip-flop 83 from a first condition to a second condition and is translated into alternately rendering NAND gate 79 conductive and nonconductive, as indicated herein. Every two pulses the output from clocking flip-flop 83 effects a change on a given output terminal of clocking flip-flop 173 from a first condition to a second condition. Similarly, every two changes in condition of the output terminal of clocking flip-flop 173, or every four pulses of the synchronization signal, effects a change on a given output terminal of clocking flip-flop 183 from a first condition to a second condition. Every two changes of condition on a given output terminal of clocking flip-flop 183, or every eight pulses of the synchronization signal, effects a change on a given output terminal of clocking flip-flop 185 from a first condition to a second condition. The trace $FF_1$ represents by a unit signal or a zero signal the "on" and "off" conditions, as effected by clocking flip-flop 83, when NAND gate 79, as well as NAND gate 127 in the receiving unit 55, is rendered capable of conducting therethrough, referred to simply as being conductive, of its associated function $f_4$ or for blocking its function $f_4$. Similarly, the trace labeled $FF_2$ represents the "on" condition when NAND gate 81, as well as NAND gate 279 in the receiving unit, is conductive for passing its associated function $f_3$ and when NAND gates 179 and NAND gate 283 in the receiving unit 55 block any functions that might be conducted through respective upstream NAND gates 79 and 285; and the "off" condition when NAND gates 81 and 279 block their associated function $f_3$ and when NAND gates 179 and 283 conduct onward any functions conducted through respective NAND gates 79 and 285. The trace $FF_3$ represents the "on" condition when NAND gate 167 and NAND gate 297 in the receiving unit 55 will conduct their associated function $f_2$ therethrough and when NAND gates 189 and 191, and receiving NAND gates 301 and 285 will block any functions conducted via NAND gates 81, 79 and 179, and receiving NAND gates 265 and 267; and the "off" condition when NAND gates 167 and 297 will block their associated function $f_2$ and NAND gates 189 and 191, and 301 and 285 will conduct their respective functions therethrough. Likewise, the trace $FF_4$ represents the "on" condition when NAND gate 169 and receiving NAND gate 313 will conduct their associated function $f_1$ therethrough and when NAND gates 197, 199 and 201, and receiving NAND gates 129, 265 and 267 will block any functions conducted respectively through NAND gates 167, 81 and 189, and 79, 179, and 191 and through receiving diode means 141, 273, and 275; and the "off" condition when NAND gates 169 and 313 will block associated function $f_1$ and NAND gates 197, 199, and 201 will conduct their respective associated functions therethrough and when receiving NAND gates 129, 265, and 267 will conduct all functions therethrough. The transmitted signal "Trans" illustrates the breakdown of the functions and signals during one cycle and the operation of the apparatus.

Specifically, NAND gate 169 is rendered conductive by a zero signal impressed on conductor 193. Simultaneously, a unit signal is impressed on conductor 195 by clocking flip-flop 185, rendering nonconductive NAND gates 197, 199 and 201 effectively blocking transmission of any signal therethrough regardless of whether or not upstream NAND gates are conductive. Thus, for effectively eight pulses of the synchronization signal, all other channels of communication are blocked and the channel through NAND gate 169 conductive for passing its associated function $f_1$ therethrough. Accordingly, the lowest frequency function $f_1$ is transmitted during this interval to obtain the greatest information content thereof.

On the eighth pulse, however, NAND gate 169 is rendered nonconductive and NAND gates 197, 199 and 201 are rendered conductive. At this time NAND gate 167 connected to the upper terminal of clocking flip-flop 183 is rendered conductive, as indicated by signal $FF_3$, and NAND gates 189 and 191 are nonconductive to block conduction of any signal by way of either NAND gate 79 or NAND gate 81. The second lowest frequency function $f_2$ is transmitted during this part of the cycle.

On the twelfth pulse, however, NAND gate 167 is rendered nonconductive and NAND gates 189 and 191 are rendered conductive. At this time, NAND gate 81 is rendered conductive, as indicated by trace $FF_2$.

Simultaneously, NAND gate 179 is rendered nonconductive to block output from NAND gate 79. Thus, the function $f_3$ being conducted via inverter amplifier 73, conductor 77 and NAND gate 81 is also passed through NAND gates 189 and 199 to amplifier 105 for transmission on line 51 to the receiving location, just as the preceding functions $f_1$ and $f_2$ were transmitted. The function $f_3$ is the third lowest frequency function.

On the fourteenth pulse, NAND gate 81 is rendered nonconductive and NAND gate 179 is rendered conductive. At this time, NAND gate 79 is rendered conductive so the highest frequency function $f_4$ is conducted via inverter amplifier 71, conductor 75, and NAND gates 79, 179, 191, and 201 to amplifier 105 for transmission over communication link 51 to the receiving location.

This mode of interconnection in which intervals of varying length, as measured by the pulses from clocking input means, are available for transmitting functions of widely varying frequency is referred to as the ripple interconnection mode, or simply the ripple mode.

At the end of the fifteenth pulse, all clocking flip-flops have a common condition as indicated by traces $FF_1$, $FF_2$, $FF_3$ and $FF_4$ being at zero, or "off". Accordingly, a master synchronization signal is generated and by feedback, and by inversion and amplification sent to slave all clocking flip-flops, in the receiving location and, if desired, in the transmitting location, to the beginning of a new cycle. As indicated on the transmitted signal of FIG. 5, the master synchronization signal is inverted, multiplied and transmitted as spike 322.

Thus, it can be seen that the respective functions are transmitted in a predetermined sequence to effect a complete cycle, the beginning and the end of which are marked by the master synchronization signal.

At the receiving location, the master synchronization signals, as well as the respective functions, are amplified. The master synchronization signal is passed to diode means 115 and multiplied by multiplier 239 to form a slave synchronization signal having the same frequency as and synchronized with the synchronization signal from the clocking input means. The slave synchronization signal is sent to clocking flip-flop 253. Every pulse effects a change on a given output terminal of clocking flip-flop 253 from a first condition to a second condition. Every two pulses, the output from clocking flip-flop 253 effects a change on a given output terminal of clocking flip-flop 255 from a first condition to a second condition. Similarly, every second change in condition of the given output terminal of clocking flip-flop 255, or every four pulses of the slave synchronization signal effects a change on a given output terminal of clocking flip-flop 257. Every second change of condition on the given output terminal of clocking flip-flop 257, or every eight pulses of the slave synchronization signal effects a change on a given output terminal of clocking flip-flop 259 from a first condition to a second condition.

Consequently, NAND gate 313 is conductive for the first eight pulses, as indicated by $FF_4$, FIG. 5, to transmit function $f_1$ to surface equipment 65 and, thence, to strip chart recorder 67, which has a strip chart that is being moved in proportion to depth by the slave synchronization signal. On strip chart recorder 67, a first pen records the function $f_1$. Simultaneously, NAND gates 129, 265, and 267 are nonconductive and block conduction of any other functions onto their respective channels.

Beginning with the eighth pulse, however, NAND gate 313 is rendered nonconductive and NAND gates 129, 265 and 267 are rendered conductive to pass the remaining functions $f_2$, $f_3$, and $f_4$ therethrough. At the same time, NAND gate 297 is rendered conductive to pass function $f_2$ to surface equipment 65 and, thence, to strip chart recorder 67. On strip chart recorder 67, a second pen records the function $f_2$ on the strip chart. On the other hand, functions $f_3$ and $f_4$ are blocked by the rendering nonconductive of NAND gates 301 and 285.

At the twelfth pulse, NAND gate 297 is rendered nonconductive and NAND gates 301 and 285 are rendered conductive to pass functions $f_3$ and $f_4$ therethrough. At the same time, NAND gate 279 is rendered conductive to pass function $f_3$ from NAND gate 301 to surface equipment 65 and, thence, to strip chart recorder 67. On strip chart recorder a third pen records the function $f_3$ on the strip chart. Simultaneously NAND gate 283 blocks conduction of function $f_4$.

At the fourteenth pulse of slave synchronization signal, NAND gate 279 is rendered nonconductive and NAND gate 283 is rendered conductive. At the same time, NAND gate 127 is rendered conductive to pass function $f_4$ to surface equipment 65 and, thence, to strip chart recorder 67. A fourth pen records function $f_4$ on the strip chart.

If desired, separate strip chart recorders can be provided to record the respective functions separately and individually on a strip chart being moved in response to the slave synchronization signal.

Upon receipt of the master synchronization signal, all clocking flip-flops are reset to begin a new cycle and ensure that the respective functions are recorded in their predetermined order within the cycle.

The embodiment illustrated in FIG. 4 illustrates how additional channels can be incorporated into the transmitting and receiving locations, as compared with FIG. 2, to effect transmission of as many functions as desired.

Figure 6:
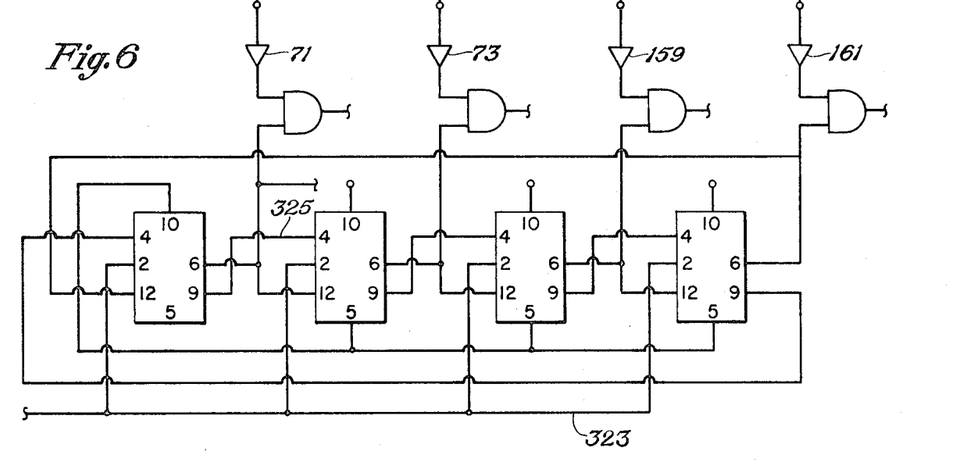
FIG. 6 is a schematic illustration of an electrical circuit employing a modified decimal, or ring, arrangement having approximately equal time intervals for transmission of respective functions in another embodiment of the invention.

The operation of the ripple interconnection of clocking flip-flops and NAND gates has been explained hereinbefore. In effect, the operation of the clocking flip-flops is as a counter in an exponential power of two. If desired, the clocking flip-flops can be interconnected to effect a counting output wherein the respective functions are transmitted the same length of time, referred to as a decimal system. In the decimal system, the clocking flip-flops are connected as a ring counter to afford a predetermined sequence of equal, spaced intervals for transmitting functions. The interconnection of the clocking flip-flops to effect the decimal system is explained in principle in "Engineering Electronics", John D. Ryder, McGraw-Hill Book Company, New York, 1967, pages 298–304. An excellent and up to date discussion of operation of transistorized shift registers connected as a ring counter is given in "Design and Application of Transistor Switching Circuits", Texas Instruments Electronics Series, Lewis A. Delhom, McGraw-Hill Book Company, 1968, pages 246-249. The same diode assembly is employed in the decimal arrangement as in the ripple arrangement. A typical interconnection pattern is illustrated in FIG. 6 to effect the decimal arrangement in which a cycle is composed of equal increments for transmitting respective functions. Therein the conductor functions are being transmitted via respective inverter amplifiers 71, 73, 159 and 161. In the arrangement of FIG. 6 employing Motorola type 848P diode assembly interconnected as a four stage ring counter, when a zero signal is sent to terminal 6 and a unit signal is sent to terminal 9, the zero signal is supplied to the associated NAND gate to render it conductive; and also sent to terminal 12 of the next succeeding clocking flip-flop and the unit signal on output terminal 9 is sent via conductor 325 to the next succeeding clocking flip-flop inlet terminal 4 to prepare the next clocking flip-flop to respond to the next pulse on clocking input conductor 323. In response to the next pulse the next clocking flip-flop will generate a zero signal on its terminal 6 and a unit signal on its terminal 9. The respective signals are passed to the associated NAND gate and the next succeeding clocking flip-flop, with the same results. On the other hand, a zero signal on terminal 9 and a unit signal on terminal 6 inhibits the responsive operation of the next clocking flip-flop and prevents its changing conditions even though connected with clocking input conductor 323 for receipt of the next pulse. Clocking input conductor 323 may be, for example, conductor 47 from depth function generating means 29. As a consequence of the ring operation, each of the respective input means are connected in sequence with amplifier 105 for transmission to the receiving location; and after a complete cycle has been connected, the first input means is again connected onto the transmission line.

The master synchronization signal may be any signal from any one of the clocking flip-flops in the decimal counter arrangement.

It will be understood that any oscillator means; such as, a master oscillator; can be employed as the clocking input means 29. Preferably, the clocking input means is related to one of the parameters which is employed as a synchronization signal. In this way, the one additional parameter can be transmitted without use of a separate channel to transmit the functions related thereto.

Figure 7:
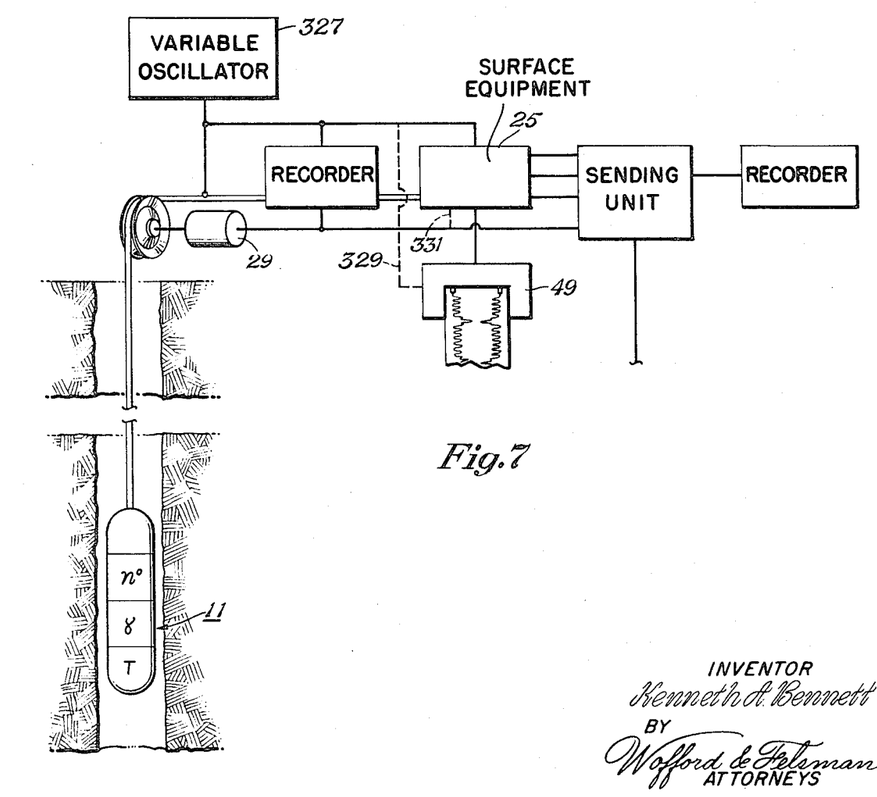
FIG. 7 is a schematic illustration of an embodiment of the invention employing a variable oscillator means to effect a clocking input signal.

To ensure that the master oscillator that is employed in the invention provides repetitive pulses of a frequency low enough to enable meaningful transmission of the functions, a variable oscillator may be employed. FIG. 7 illustrates an adaptation of the well logging system of FIG. 1 in which a variable oscillator 327 is employed to send the clocking input signal both to the downhole tool 11 and to the surface equipment 25. In this way, meaningful data incorporating functions from the respective parameters may be obtained regardless of the speed of logging; and, consequently, the repetition rate from depth function generating means 29. Specifically, the output from depth function generating means 29 is recorded as a separate function simultaneously with the clocking input means from variable oscillator 327.

As indicated by dashed lines 329 and 331, strip chart recorder 49 can be driven in response to the output from variable oscillator 327 and the depth recorded via surface equipment 25, on the strip chart as an additional function by a separate pen. Ordinarily, however, it will still be advantageous to move strip chart on strip chart recorder 49 in response to depth.

Where variable oscillator 327 is employed to secure the respective functions from the downhole apparatus for measuring respective parameters, the synchronization signal therefrom can be employed as a synchronization signal for transmission of the functions to a receiving location remote therefrom. On the other hand, it may be apparent from an inspection of the strip chart recorder 49 that the signals from depth function generating means 29 are of low enough frequency to use as a synchronization parameter. In such instances, the output from variable oscillator 327, in the recorded data, is replaced with the output from depth function generating means 29 as a synchronization parameter for transmitting to the receiving location. Thereafter the information is transmitted as described with respect to the preceding FIGS. 2 or 4, depending upon the number of functions being transmitted in a given cycle.

The materials of construction of the well logging equipment, surface equipment, recorders and elements within the sending and receiving units are complex but well known. Consequently, no further description is required herein.

Thus, it can be seen that the invention enables transmitting a plurality of functions over a single conductor in response to a synchronization signal that may be employed to effect transmission intervals of variable lengths of relative time for transmitting parameters of various frequencies or, alternatively, effect transmission intervals of equal lengths of relative time for transmitting functions that do not vary widely in frequency. Particularly, it can be seen that the invention enables transmitting well logging data in response to depth signals as a synchronization signal and preserving the raw form of the well logging data such that the received data can be replayed with the requisite adjustments in gain control to preserve all of the information content originally present in the functions without regard to operator error at the well site.

Although the invention and the been described with a certain degree of particularity, it is understood that the present disclosure has been made only by way of example and that numerous changes in the details of construction and the combination and arrangement of parts may be resorted to without departing from the spirit and scope of the invention.

What is claimed is:

1. A method of transmitting a plurality of functions, each containing data regarding a plurality of parameters, comprising the steps of:
    a. selecting one of said parameters to serve as a synchronization parameter;
    b. converting the portion of said functions not already having the characteristics of a frequency-type signal having at least repetitive pulses of a given polarity to said frequency-type signal;
    c. at a transmitting location providing a plurality of transmitting means, at least one each for conducting each respective said function; effecting conduction of said transmitting gating means sequentially in response to clocking input pulses comprising the repetitive pulses of said synchronization parameter to effect a cycle; transmitting said functions conducted sequentially through respective said gating means; and generating and effecting transmission of a master synchronization signal of opposite polarity after a predetermined number of said repetitive pulses of said synchronization parameter complete each cycle;

d. at a receiving location spaced from said transmitting location, receiving said functions and signals that were transmitted from said transmitting location, discriminating said master synchronization signal, and increasing the frequency thereof back to the frequency of said repetitive pulses of said synchronization parameter to form slave repetitive pulses that are synchronized with said repetitive pulses of said synchronization parameter; and e. providing a plurality of receiving gating means, at least one each for receiving said respective functions for said parameters, effecting reception of said functions in each of said receiving gating means in the same sequence as said associated transmitting gating means and in response to said slave repetitive pulses;

conduction of each said gating means being effected in response to a flip-flop means that is, in turn, responsive respectively and ultimately to said repetitive pulses of said synchronization parameter and said slave repetitive pulses; said flip-flop means being connected in a ripple arrangement such that it effects unequal intervals that vary as digital exponential powers of two in terms of number of clocking input pulses for transmission of each of said functions, a change in condition being provided on a given output terminal of each of said flip-flop means sequentially, the associated gating means being rendered conductive in response to said change in condition, and at least one of said flip-flop means that renders conductive the associated gating means for conducting therethrough the associated function also simultaneously rendering nonconductive another gating means to block conduction of another function;

whereby $n$ functions are transmitted employing $n-1$ intervals in a cycle and received functions are separated and duplicate said original functions.

2. The method of claim 1 wherein at least one of said flip-flop means rendering conductive the associated gating means for conduction therethrough of said associated function simultaneously renders nonconductive a plurality of gating means thereby blocking conduction of a plurality of other functions.

3. A method of transmitting a plurality of functions containing data regarding a plurality of parameters, comprising:

a. providing at one location a master oscillator means that provides at least repetitive pulses of a frequency low enough to enable meaningful transmission of said functions and a plurality of transmitting gating means, one each for transmitting respective functions, said functions being related to parameters logged in a well penetrating subterranean formations; effecting conduction of said transmitting gating means sequentially in response to repetitive pulses from said master oscillator means to effect a cycle and effecting transmission of a master synchronization signal after each cycle is completed; said master oscillator comprising a variable oscillator that provides an oscillator output signal that can be varied in frequency to effect a clocking input of various frequencies for sending downhole and effecting switching onto a monoline cable of various apparatus measuring respective parameters downhole; said functions being recorded at the surface with respect to said oscillator output signal and a depth function being simultaneously correlatably recorded; and b. establishing communication between said master oscillator, said transmitting gating means and a slave oscillator means and receiving gating means at a receiving location spaced from said one location; receiving, recording, and discriminating said master synchronization signal and maintaining said slave oscillator means synchronized with said master oscillator means, and effecting reception and recording of said respective functions via respective ones of said receiving gating means in the same sequence as said associated transmitting gating means transmits said functions in response to repetitive pulses from said slave oscillator means.

4. The method of claim 3 wherein said oscillator output signal which was employed as a synchronization signal is replaced by said depth function as the synchronization signal for transmission of the remaining functions to another location.

5. A system for transmitting over a monoline cable a plurality of functions related to a respective plurality of parameters measured by apparatus in a downhole tool in a well penetrating subterranean formations, comprising:

a. a plurality of input means comprising said apparatus measuring said parameters and each generating one of said functions related to a given parameter; said functions that are received at the surface being recorded by a recording means and the function related to depth being simultaneously recorded by said recording means;

b. a plurality of transmitting gating means, each connected respectively with one of said input means and operable into a first condition for gating through a respective function and into a second condition for blocking said function in response to a frequency-type synchronization signal having at least repetitive pulses of a given polarity;

c. clocking flip-flop means connected with said transmitting gating means so as to render respective ones of said transmitting gating means in said first condition in response to said synchronization signal and in sequence to complete a cycle;

d. amplifier means connected with said gating means for transmitting the signals and functions gated therethrough;

e. a plurality of receiving gating means spaced from and in communication with said amplifier means for receiving said functions gated through associated said transmitting gating means and operable into a first condition for gating through said function from said associated transmitting gating means and into a second condition for blocking said function in response to said synchronization signal;

f. clocking flip-flop means connected with said receiving gating means so as to render respective ones of said receiving gating means in said first condition in response to said slave synchronization signal and in the same sequence as the transmitting gating means associated with the respective parameter;

g. a plurality of output means, each connected respectively with one of said receiving gating means for duplicating said original function transmitted from said input means downhole; and h. a variable oscillator means connected with said clocking flip-flop means connected with said transmitting gating means and with said clocking flip-flop means connected with said receiving gating means for providing a synchronization signal for maintaining synchronization therebetween.

6. The system of claim 5 wherein a recorder is connected with said monoline cable for recording pulses from said variable oscillator means and said functions and with a depth function generating means for simultaneously recording depth in said well; wherein there is provided a second transmitting means comprising:

a. a plurality of input means comprising said output means of element g;

b. a plurality of transmitting gating means, each connected respectively with one of said input means and operable into a first condition for gating through a respective function and into a second condition for blocking said function in response to a frequency-type synchronization signal having at least repetitive pulses of a given polarity;

c. a depth function generating means for effecting a clocking input synchronization signal in response to the depth function recorded synchronously with said functions;

d. clocking flip-flop means connected with said depth function generating means and transmitting gating means so as to render respective ones of said transmitting gating means in said first condition in response to said synchronization signal and in sequence to complete a cycle;

e. inverter amplifier means for inverting and amplifying said synchronization signal;

f. synchronization gating means connected at least with said clocking flip-flop means at the terminal that changes its state of electrical charge no more often than any other and with said inverter amplifier for sending a master synchronization signal after a complete cycle;

g. amplifier means connected with said gating means for transmitting the signals and functions gated therethrough;

h. discriminating means spaced from but in communication with said amplifier means for discriminating said master synchronization signal;

i. frequency increasing means for increasing the frequency of said master synchronization signal back to the same frequency as said synchronization signal to form a slave synchronization signal that is synchronized with said synchronization signal;

j. a plurality of receiving gating means, each in communication with said amplifier means for receiving said functions and signals gated through associated said transmitting gating means and operable into a first condition for gating through said function from said associated transmitting gating means and into a second condition for blocking said function from said transmitting gating means in response to said slave synchronization signal;

k. clocking flip-flop means connected with said receiving gating means so as to render respective ones of said receiving gating means in said first condition in response to said slave synchronization signal and in the same sequence as the transmitting gating means associated with the respective parameters; and l. a plurality of output means, each connected respectively with one of said receiving gating means for duplicating said original data.

7. A system for transmitting a plurality of functions related to a respective plurality of parameters, comprising:

a. a plurality of input means, each for providing a function related to a given parameter;

b. a plurality of transmitting gating means, each connected respectively with one of said input means and operable into a first condition for gating through a function from said one of said input means and into a second condition for blocking said function from said one of said input means in response to a frequency-type synchronization signal having at least repetitive pulses of a given polarity;

c. clocking input means for effecting said synchronization signal;

d. clocking flip-flop means connected with said transmitting gating means and with said clocking input means so as to render respective ones of said transmitting gating means in said first condition in response to said synchronization signal and in sequence to complete a cycle;

e. inverter amplifier means for inverting and amplifying said synchronization signal;

f. synchronization gating means connected at least with said clocking flip-flop means at the terminal that changes its state of electrical charge no more often than any other and with said inverter amplifier for sending a master synchronization signal after a complete cycle;

g. amplifier means connected with said gating means for transmitting the signals gated therethrough;

h. discriminating means spaced from but in communication with said amplifier means for discriminating said master synchronization signal;

i. frequency increasing means for increasing the frequency of said master synchronization signal back to the same frequency as said synchronization signal to form a slave synchronization signal that is synchronized with said synchronization signal;

j. a plurality of receiving gating means, each in communication with said amplifier means for receiving said functions and signals gated through associated said transmitting gating means and operable into a first condition for gating through said function from said associated transmitting gating means and into a second condition for blocking said function from said transmitting gating means in response to said slave synchronization signal;

k. clocking flip-flop means connected with said receiving gating means so as to render respective ones of said receiving gating means in said first condition in response to said slave synchronization signal and in the same sequence as the transmitting gating means associated with the respective parameters; and l. a plurality of output means, each connected respectively with one of said receiving gating means for duplicating said original functions.

8. The system of claim 7 wherein said clocking input means effects said synchronization signal in response to one of said functions ultimately relating to one of said parameters that serves as a synchronization parameter.

9. The system of claim 7 wherein each said clocking flip-flop means has its output terminals connected with respective input terminals of the next succeeding clocking flip-flop means such that it renders said next succeeding flip-flop means in readiness to receive and respond to a pulse from said clocking input means when said each said clocking flip-flop means is rendered conductive and to inhibit said next succeeding clocking flip-flop means when said each said clocking flip-flop means is nonconductive; and said synchronization gating means is connected with an output terminal of only one of said clocking flip-flop means for generating a master synchronization signal upon the change of condition on the output terminal of said one clocking flip-flop means, whereby each of said transmitting gating means are rendered conductive sequentially and respectively and said master synchronization signal is generated and transmitted after a cycle is completed.

10. The system of claim 7 wherein said clocking flip-flop means are connected in a ripple arrangement wherein the output terminal of each said clocking flip-flop means connected with respectively said transmitting gating means and said receiving gating means is also connected with the input terminal of the next succeeding clocking flip-flop means for effecting unequal intervals for transmitting said functions, said intervals varying in length as digital exponential powers of two in terms of number of clocking input pulses, and at least one of said clocking flip-flop means is connected to a plurality of gating means for rendering one of said gating means alternately conductive and nonconductive and for rendering the remainder of the gating means to which it is connected alternately nonconductive and conductive, out of phase with one of said gating means.

11. The system of claim 10 wherein there are n input means and n output means and at least one clocking flip-flop means connected with one transmitting gating means and at least one clocking flip-flop means connected with one receiving gating means via one respective output terminal and connected with $(n-1)$ gating means via another respective output terminal and operable to render conductive and nonconductive said one of said respective gating means and to render nonconductive and conductive said $(n-1)$ gating means, out of phase with said one of said respective gating means for alternately conducting one function and blocking the $(n-1)$ remaining functions and vice versa; a second transmitting clocking flip-flop means is connected with a second transmitting gating means and a second receiving clocking flip-flop means is connected with a second receiving gating means via one of their respective output terminals and connected with $(n-2)$ associated gating means via another of their respective output terminals and operable to render conductive and nonconductive respective said second gating means and to render nonconductive and conductive respective said $(n-2)$ gating means, out of phase with said second gating means for alternately conducting a second function and blocking the $(n-2)$ remaining functions and vice versa; said respective second gating means being serially connected with one of said $(n-1)$ gating means and said $(n-2)$ gating means being serially connected with the remainder of said $(n-1)$ gating means to effect respective series connected circuits for conducting functions from the respective input means to the respective output means.

12. The system of claim 7 wherein said clocking input means comprises a depth measuring means affording output pulses and said functions are related to parameters that are measured in a borehole penetrating subterranean formations.

13. The system of claim 12 wherein each of said input means comprises a means for generating and transmitting a function related to a given parameter measured in said borehole and before said function is operated on by surface equipment.

14. The system of claim 7 wherein said clocking input means comprises a variable oscillator settable to a predetermined frequency at the surface and wherein at least said elements a, b, d, e, f, and g are carried in a downhole tool and are employed in transmitting functions related to parameters measured in a borehole penetrating subterranean formations.

15. The system of claim 7 wherein said gating means comprises a plurality of logic circuits and said clocking flip-flop means comprises a bistable multivibrator.

16. The system of claim 15 wherein the output terminals of each said clocking flip-flop means connected with its associated gating means are connected to a respective input terminal on individual logic circuits whose output terminals are connected through diode means to a feedback conductor; said feedback conductor being connected to the other respective input terminals of said individual logic circuits and to an inverter amplifier for generation, inversion, amplification and transmission of a master synchronization signal.

17. The system of claim 7 wherein there are two input means and a cycle comprises functions related to two parameters.

18. The system of claim 17 wherein said input means comprise means in a downhole tool for measuring parameter related to absorption and backscatter of gamma rays and to absorption of neutrons and gamma rays emitted in response thereto.

19. The system of claim 17 wherein said input means includes a third input means and wherein one of said input means provides data related to temperature measured in said borehole.

* * * * *